United States Patent [19]
Juanarena et al.

[11] Patent Number: 4,753,105
[45] Date of Patent: Jun. 28, 1988

[54] ELECTRONIC PRESSURE SCANNER

[75] Inventors: Douglas B. Juanarena, Newport News; Timothy W. Worst, Grafton; George Walker, Gloucester, all of Va.

[73] Assignee: Pressure Systems Incorporated, Hampton, Va.

[21] Appl. No.: 5,747

[22] Filed: Jan. 22, 1987

[51] Int. Cl.[4] ............................................. G01L 27/00
[52] U.S. Cl. ....................................................... 73/4 R
[58] Field of Search .......................................... 73/4 R

[56] References Cited
U.S. PATENT DOCUMENTS

| | | | |
|---|---|---|---|
| 4,111,058 | 9/1978 | Gross | 73/4 R X |
| 4,182,158 | 1/1980 | Culotta et al. | 73/4 R X |
| 4,446,715 | 5/1984 | Bailey | 73/1 R |
| 4,483,178 | 11/1984 | Miille | 73/4 R X |
| 4,512,179 | 4/1985 | Umble et al. | 73/4 R |

Primary Examiner—Tom Noland
Attorney, Agent, or Firm—Oblon, Fisher, Spivak, McClelland & Maier

[57] ABSTRACT

A rugged electronic pressure scanner which is capable of withstanding extreme environmental conditions is provided with a transducer per port configuration. Internal multiplexing, amplification and integral calibration valve permit on-line calibrations. The construction of a plurality of individual transducer modules each containing its own electronics permits field replacement of individual pressure transducer modules in the event of destruction or inoperativeness.

19 Claims, 10 Drawing Sheets

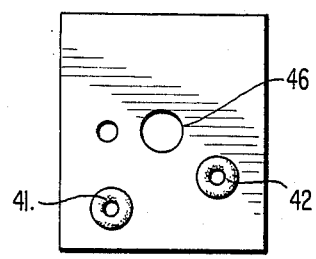
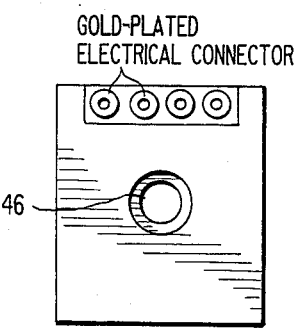
FIG. 4A   FIG. 4B
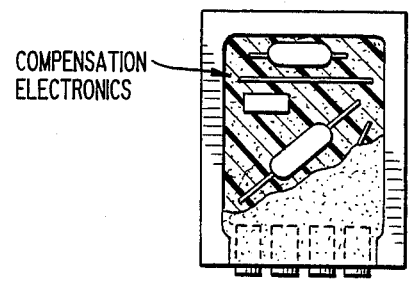
FIG. 4C
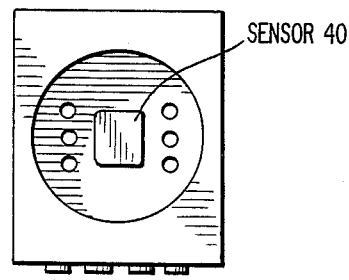
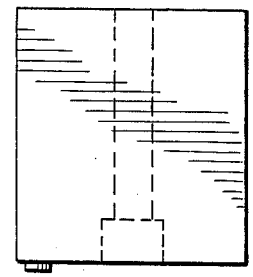
FIG. 4D   FIG. 4E

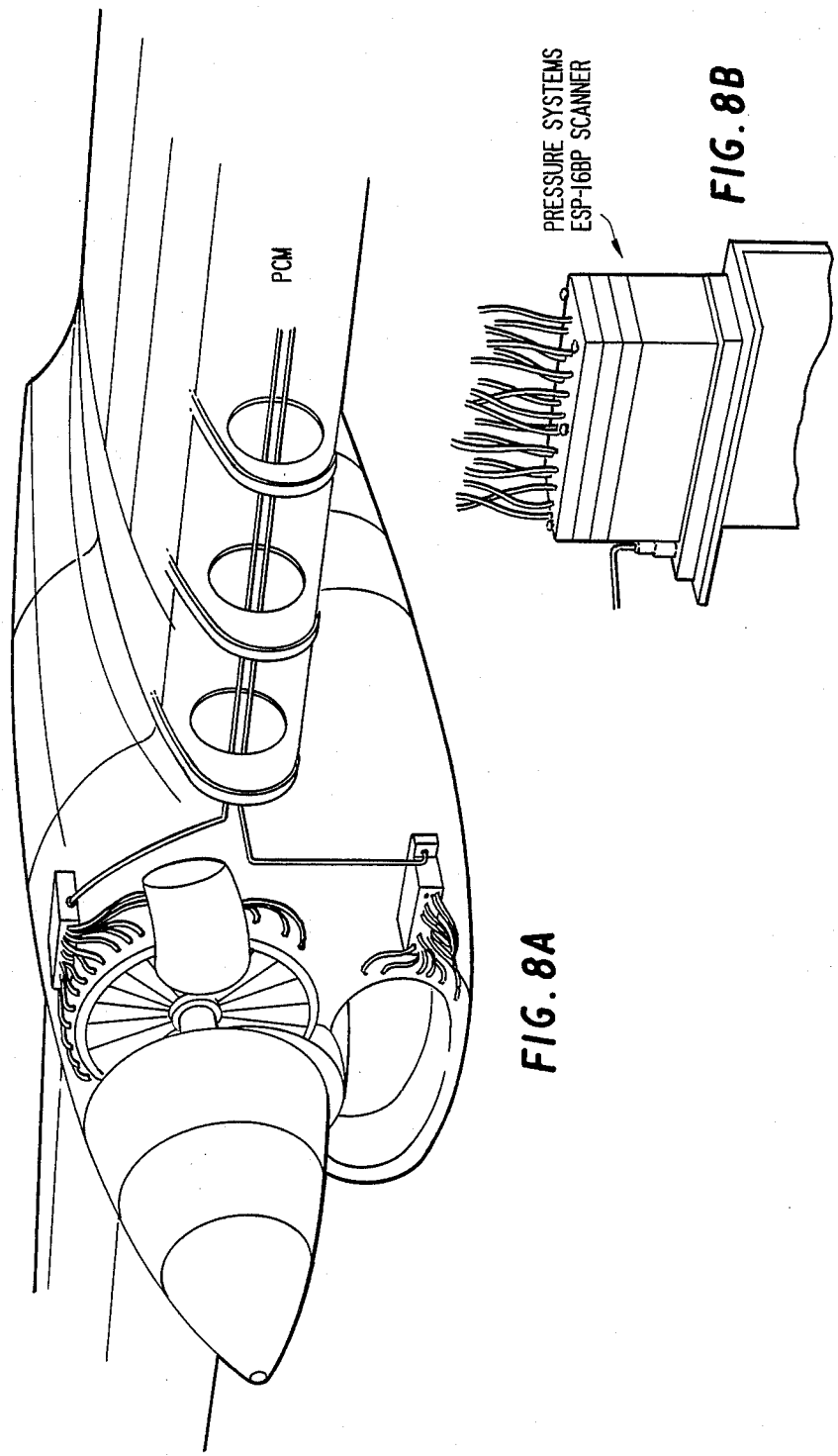

4,753,105

ELECTRONIC PRESSURE SCANNER

BACKGROUND OF THE INVENTION

1. Field of the Invention

The present invention relates to the field of electronic pressure scanners developed to withstand the extreme environmental conditions associated with the design and development of modern gas turbines.

2. Discussion of Background

Because of the need to perform many measurements, the design and the development of modern gas turbines is a complex and expensive operation. Testing turbines require mostly low frequency air pressure measurements in order to assess the turbine steady state performance and a fewer number of measurements in the 100 Hz region to analyze the turbines handling characteristics. The low frequency measurements may require up to 2000 parameters to be measured and with up to 500 parameters required to be measured in the 100 Hz region. In order to reduce pneumatic delay and increase throughput, there is a requirement for the transducers and the signal conditioning equipment associated with them to be moved from the control room to the engine test frame or to the vehicle. Thus, because of the relocation of the instruments from the control room to the engine test environment, there must be a strict immunity to temperature extremes and to vibrations while the same accuracy must be found in the engine environment as had been obtained in the control room environment.

The prior art electrically scanned pressure sensor modules which utilize pressure sensor chips are exemplified by U.S. Pat. No. 4,111,058 wherein a plurality of solid state pressure sensor chips and signal multiplexing electronics are integrally mounted on a position pressure selector switch which has a plurality of positions. A first position of the switch connects a calibrating pressure source to all of the pressure sensor chips. The other positions of the selector switch provides for connections with the plurality of different locations which are connected to the chips. A digital code is applied to the multiplexing electronics during the time that the pressure selector switch is at each of its multiple positions. The analog output of all the sensors is multiplexed into a single output to reduce the number of wires which exit the instrument.

Despite the theoretical applicability of this type of system, it can be seen that the use of the pneumatic switching structure inherently provides delays required by the switching time which severely limits the scanning rate which can be accomplished. Furthermore, the structure of this type of system inherently precludes any field repair due to an inevitable break down of any one of the sixteen transducers. Not only is it impossible to determine what has failed about the transducer, but it is impossible to replace an individual transducer in the field.

Other problems which exist with this type of prior art shown by U.S. Pat. No. 4,111,058 include a lack of an option for individual differential configurations, the ability to select calibration and measurement reference pressures and any reliability during its operation in high vibration applications. It is also notable that this type of prior art scanner is not able to distinguish between the various transducers in the sense that there is no assurance that each transducer is compensated with respect to zero offset and thermo-zero shift in any manner different from any of the other sixteen transducers. This inherently limits the accuracy available at the outputs.

It is this type of system to which Applicant's present improved invention is addressed.

SUMMARY OF THE INVENTION

Accordingly, it is an object of the present invention to provide an improved electronic pressure scanner which operates within the extremes indicated by various test devices, which is immune to temperature extremes and vibrations while maintaining a high accuracy and which has the ability to replace pressure transducer modules in the field.

It is the further object of the present invention to provide a scanner which operates on a individual transducer per port system, which provides internal multiplexing and which has an amplification and an integral calibration valve to provide on-line calibrations.

It is yet a further object of the present invention to provide a design for the transducer modules which utilizes, within each module, an internal zero offset and a thermal compensation and which utilizes "O" ring seals.

It is an object of the present invention to provide a calibration valve structure for the scanner which features dynamic "O" ring seal design, bi-stable operation, switched reference pressures and purge capability.

It is a further object of the present invention to provide a scanner system which is able to be reconfigured by the user in order to provide for individual differential pressure measurements with an individual reference pressure for each port.

The present invention utilizes a high-data rate electronically scanned pressure scanner with in-situ calibration which utilizes an array of silicon integrated circuit pressure transducers which are digitally addressed by analog multiplexer circuits wherein the output is provided to an internal instrumentation amplifier and a pneumatically actuated calibration valve.

BRIEF DESCRIPTION OF THE DRAWINGS

A more complete appreciation of the invention in many of the attendant advantages thereof will be readily obtained as the same becomes better understood by reference to the following detailed description when considered in connection with the accompanying drawings, wherein:

FIG. 3b is a cut-away view of the calibration valve of the pressure scanner of FIG. 3a.

FIG. 3c is a partially disassembled view of the pressure scanner of FIG. 3a.

FIG. 4a-e represents 5 side views of a pressure transducer module of the present invention.

FIG. 8 illustrates the in-flight use of the pressure scanner of the present invention.

DESCRIPTION OF THE PREFERRED EMBODIMENTS

Figure 1:
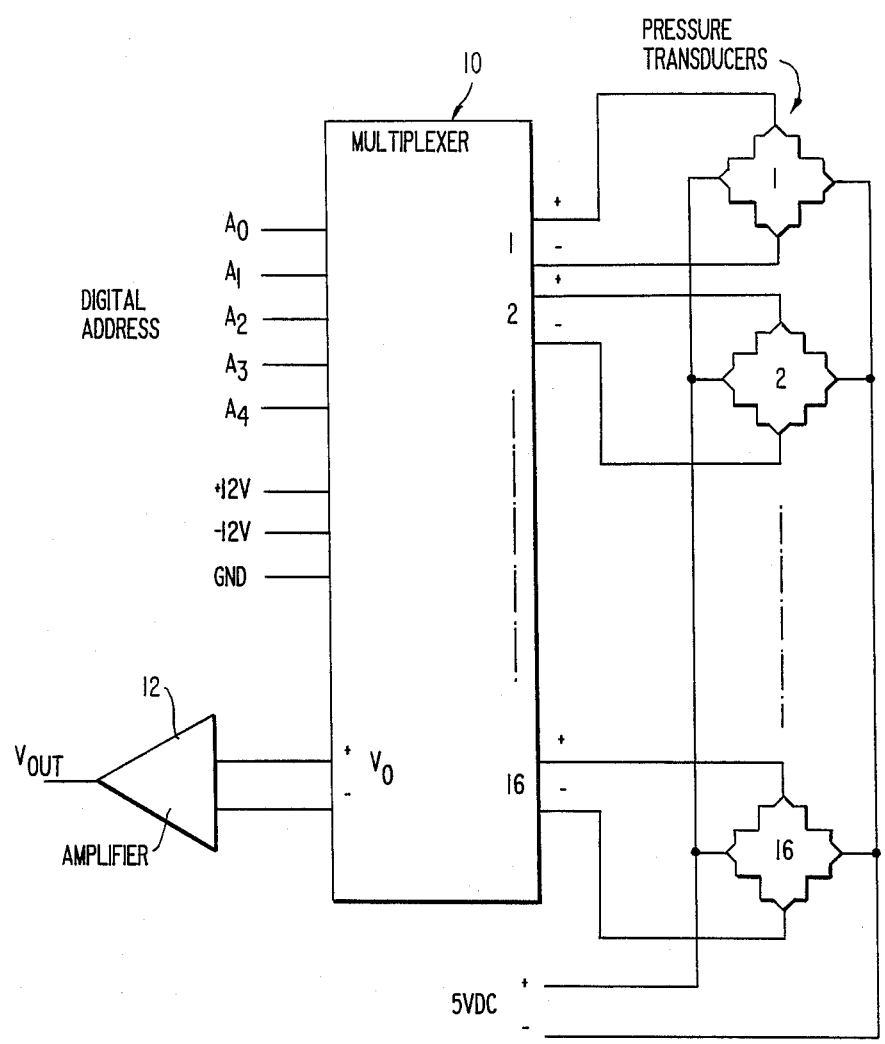
FIG. 1 is an electrical diagram of a 16 channel pressure scanner of the present invention.

Referring now to the drawings, wherein like reference numerals designate identical or corresponding parts throughout the several views, and more particularly to FIG. 1 thereof, there is shown an electrical diagram outlining the operation of the pressure transducer of the present invention. A plurality of pressure transducers T1-T16 are connected in common such that the outputs from each Wheatstone bridge are fed into a multiplexer 10 and a selected output from one of the transducers T1-T16 is fed to amplifier 20 and subsequently outputted. The particular pressure transducer which is selected is determined by a digital address selected from a plurality of inputs $A_0$-$A_4$. The power supply for each of the Wheatstone bridge constructions for the transducers is supplied by a 5 volt DC source and the power supply for the multiplexer is represented by the plus and minus 12 volts as shown in FIG. 1. Each of the electronically scanned pressure scanners (ESP) which is schematically shown in FIG. 1 consists of an array of silicon integrated circuit pressure transducers $T_1$-$T_{16}$, a digitally addressed multiplexer circuit 10 and an internal instrument amplifier 12 as well as the pneumatically actuated calibration valve 20 shown in FIG. 2 in the pneumatic diagram of the scanner. The electronically scanned pressure scanner (ESP) utilizes technology which provides for high accuracy, high reliability and a high data rate as well as being easily interfaced with a computer. The high data scan rates are possible because the voltage output from each transducer T1-T16 may be randomly or sequentially digitally addressed as is exemplified by FIG. 1. The simplicity of the computer interface is possible because the instrument requires only electrical power and the application of a binary address word. The instrument returns a nominal plus or minus 5 volt output proportional to the input pressure on the addressed channel. The minimum wire interface is achieved through the use of the internal multiplexing and decoding which is exemplified by the FIG. 5 schematic showing the details of the pressure scanner. The implementation of an internal amplifier provides high common mode noise rejection and supplies an amplified transducer output.

In order to contrast this construction with the utilization of sixteen individual pressure transducers, it is easy to see that interfacing of 16 individual pressure transducers would require 34 wires with 2 wires being for the supply and 32 wires being for the signals. On the other hand a 16 channel ESP scanner according to the present invention requires only 9 wires with 4 being for the address, 2 being for the power, 1 being ground and 2 being utilized for the signal in order to provide the interconnection as being shown in FIG. 1.

Figure 5:
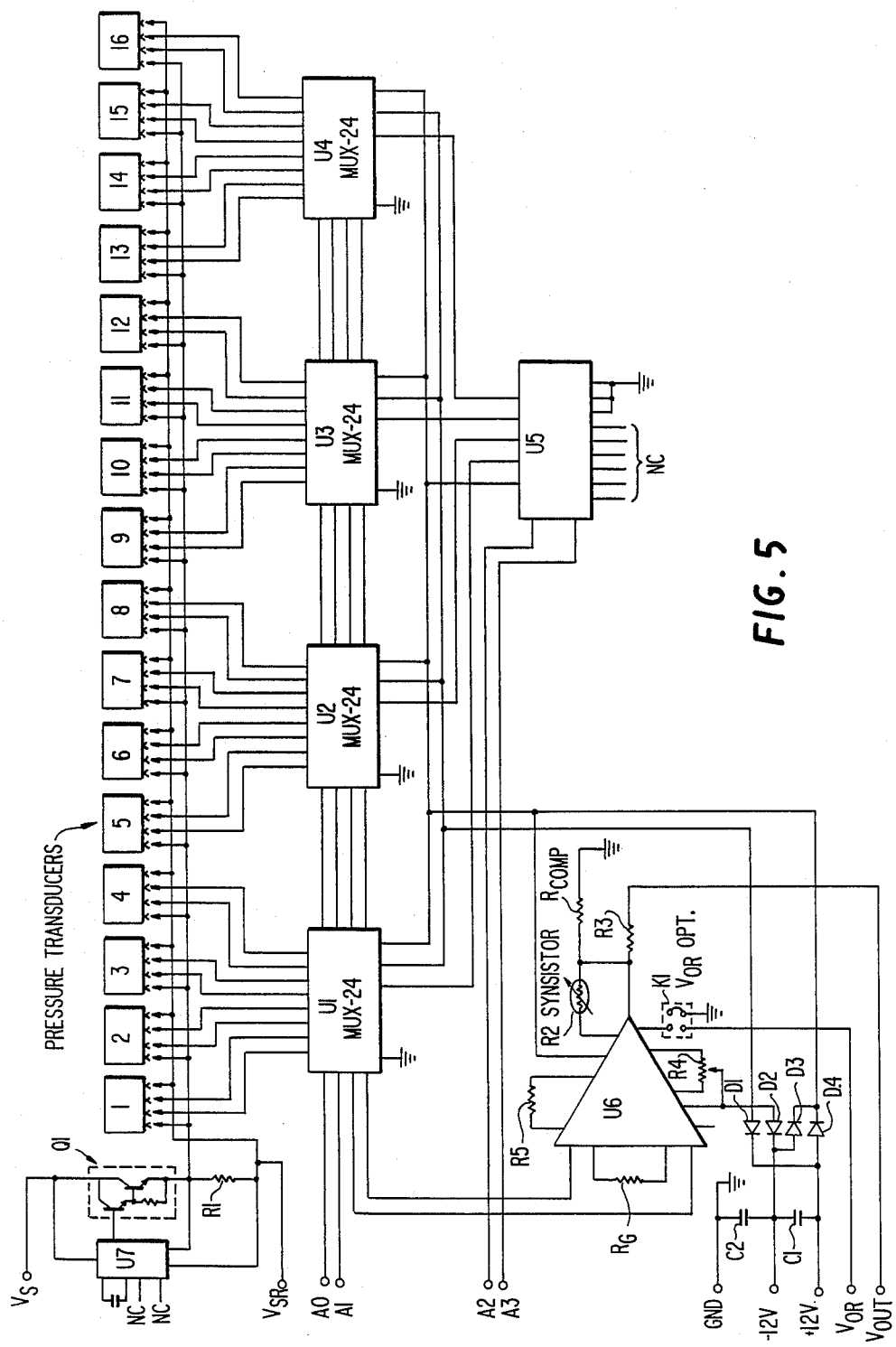
FIG. 5 is an electrical schematic of the pressure scanner.

The configuration of the specific electronics of the instrumentation is represented by the analog circuit board shown schematically in FIG. 5 which is constructed of a multi-layer design to allow for the integration of separate power and to ground layers to improve noise immunity. The analog board consists of a high grade, high slew-rate monolithic integrated circuit instrumentation amplifier U6 which amplifies the low level differential multiplexed outputs of the transducers. The use of 4 dual 4-channel bi-fet analog multiplexers U1-U4 and a digital decoder U5 allows a digital address to select the desired transducer by switching of the output of the desired transducer to the instrumentation amplifier U6 using a binary format. The instrumentation amplifier U6 is supported by the gain resistor $R_g$, the feedback resistor $R_s$, the balance resistor $R_4$ and the thermo-compensation elements $R_{comp}$ and $R_2$ (Synsistor). The output of the instrumentation amplifier U6 fed through the resistor R3 is indicated as $V_{out}$ with an option K1 which is normally connected to ground and may optionally be connected to $V_{or}$ to provide a differential output mode for balanced line output. The entire portion containing the instrumentation amplifier U6 and the associated circuitry with respect to feed back, gain regulation and thermo-compensation is what is referred to as Item No. 12 in FIG. 1. Furthermore, the combination of the multiplexer elements U1-U4 and the digital decoder U5 make up the essential portion of the multiplexer 10 of FIG. 1. Additionally, the structure of FIG. 1 and of FIG. 5 contains on the board a precision 5 volt power supply which consists of a precision voltage reference U7 in conjunction with a current boost amplifier Q1 in order to provide the transducers T1-T16 with a stable and repeatable sensor excitation voltage. This voltage is generated through the use of a regular 12 volt source which is the same source as utilized for the 12 volts being fed to the multiplexers. The utilization of such an internal power supply for sensor excitation minimizes the number of required supplies for the scanner and also eliminates the user from needing to supply critical excitation voltages. As an alternative, the user may supply their own excitation 5 volt power supply.

The construction of the embodiment of FIG. 5 utilizes for the multiplexer elements U1-U4 PMI (Precision Monolithic Industries) Model MUX-24. The digital decoder utilizes either RCA Model No. CD4028 or Motorola Model No. MC14028 for the digital decoder U5. With respect to the precision power supply, it is noted that the precision voltage reference U7 is Analog Devices Model 584 and the current boost amplifier Q1 is Motorola Model MJE-800. The instrumentation amplifier U6 is an Analog Devices Model AD521. The above structure utilizes a pressure sensor consistirig of a miniature piezo resistive silicon pressure transducer bonded to a kovar header as shown at 40 in FIG. 4(d) as well as a circuit board for compensation elements and an electrical connector as also illustrated in FIG. 4.

Figure 3A:
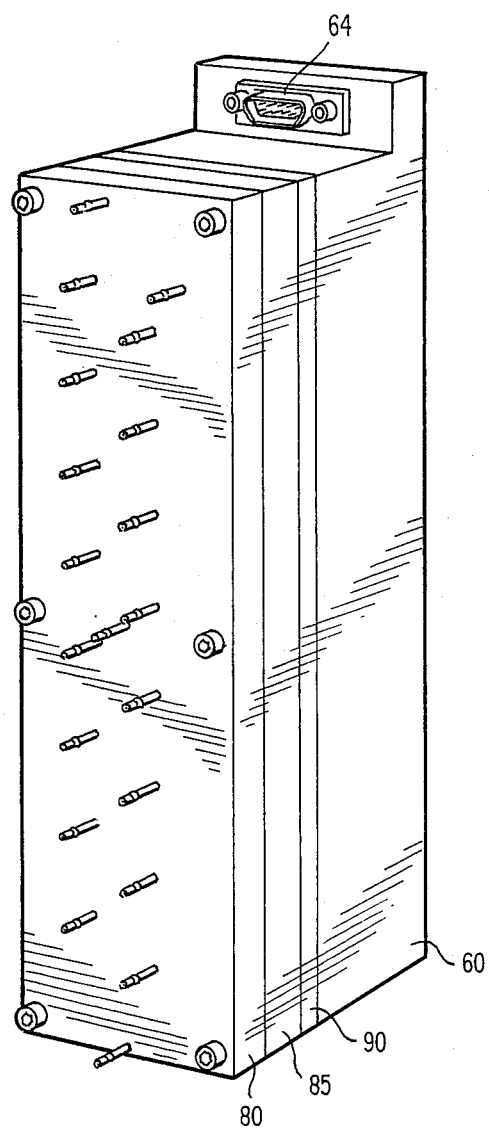
FIG. 3a is a pictoral representation of the pressure scanner.
Figure 3B:
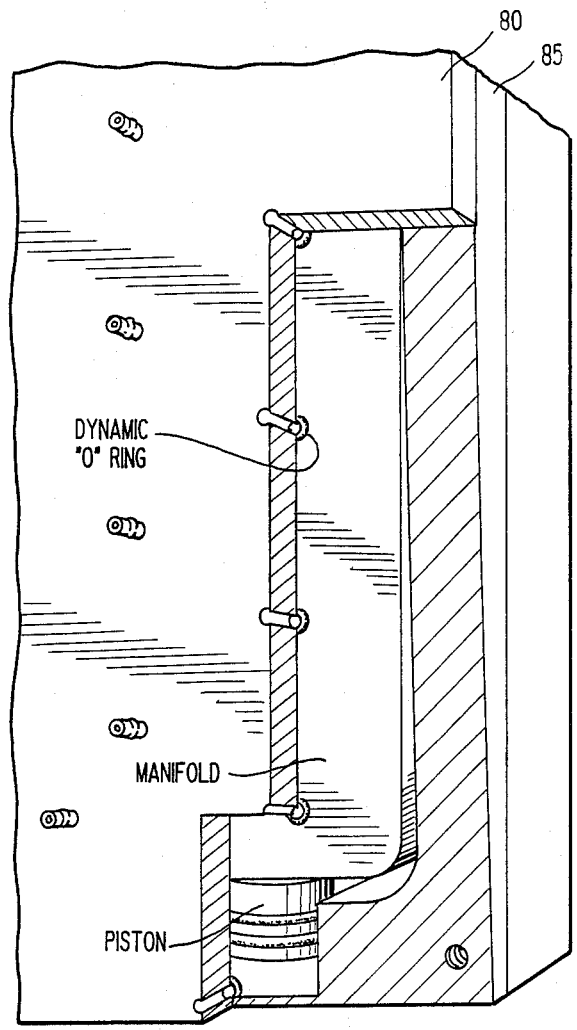
Figure 3C:
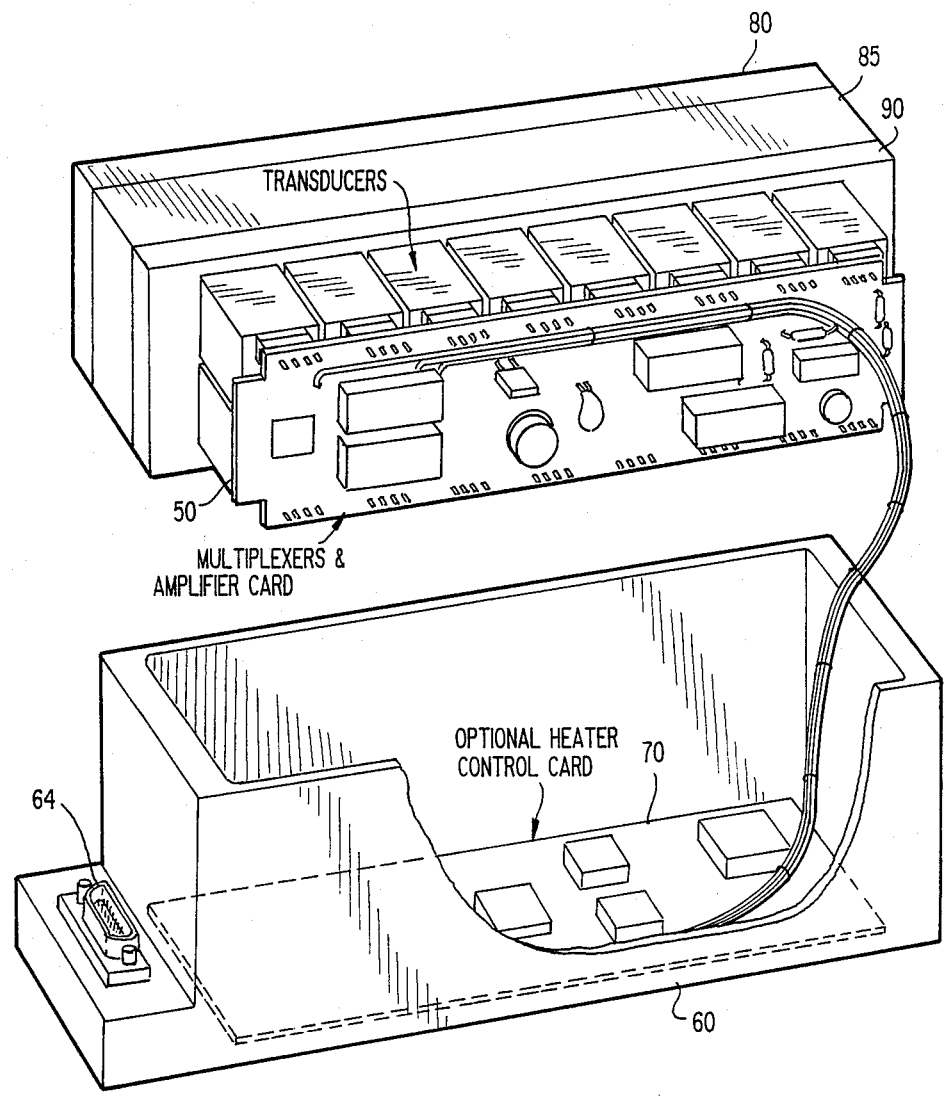

Each of the pressure sensor transducers T1-T16 are incapsulated in a unique cubical die cast housing as shown in the FIGS. 4(a-e) and FIG. 3(c). FIG. 3(c) also illustrates a partial disassembly of the remainder of the pressure scanner pictured in FIG. 3(a). Aside from the transducer element, eight of which are illustrated in FIG. 3(c), the FIGURE also shows the multiplexer and amplifier card 50 which is electrically represented in FIG. 5, as discussed above, a heater control card 60 which contains components needed to implement an electronic thermostat for control of an internal heater as well as interface items such as terminating resistors and decoupling capacitors and a series of components to protect the scanner from the polarity reversal of input power supply connections. These polarity reversal items are illustrated as Items IN4002 which are the 4 diodes $D_1$-$D_4$ of FIG. 5. The remainder of the computer control and interface circuit board 60 is constructed in a well-known manner in order to provide normal electronic thermostat control for an internal heater. This optional heater control card 70 located within the control board is an optional item which is required whenever the transducer will be operating in a very cold environment.

The remainder of FIG. 3(c) shows the input pressure tabulation plate 80 best illustrated in FIG. 1 wherein the input pressures are applied, the calibration valve manifold 85 and the pressure plate 90 to which the transducer cubical sections are applied. The various views of these items are exemplified by the pictoral of FIG. 3(a) and the cutaway of FIG. 3(b).

In addition to a multiplexed, amplified output, an analog unamplified differential output of each transducer is optionally available and when desired this output can be made via a 37 pin micro miniature D type connector 64 mounted on the controlled base plate or body 60.

The heart of each of the silicon pressure sensors is a micro-machined diaphram into which 4 piezo resistive elements have been diffused. The silicon transducers are connected in the aforementioned Wheatstone bridge configuration which generates a voltage output that is proportional to pressure input and which exhibits low hystereisis, excellent repeatability and low sensitivity to acceleration. Because of the internal voltage standard which is a precision 5 volt power supply discussed previously and shown in FIG. 5, the transducer is able to be excited without the requirement for external precision power supplies. The unique cubical design of the transducer structure incorporates "O" ring pressure seals 41 and 42 as shown in FIG. 4(a). Also shown in FIG. 4(a) is a end of a set screw 46 with the head of the set screw being shown in FIG. 4(b). This set screw, also shown at its end portion in the FIG. 4(e) view provides for easy attachment and removal of any one or all of the transducers to the pressure plate 90. This ability to make quick replacement of these transducers provides field repairability totally unknown in this type of structure in the prior art.

The unique cubic design which has the "O" ring pressure seals is mounted to the scanner with a single set screw and the electrical connections are made via gold pins and sockets for positive contact. Each one of the pressure sensors or transducers mounted within the cubical are individually compensated for zero offset and thermal-zero shift to less than plus or minus one milivolt per 100° F. The electronics for this zero offset and thermo-compensation, although well known are incorporated into each one of the transducer cubicals as shown by the FIG. 4(c). The set screw 46 and the utilization of positive gold electrical contacts as shown in the top view of FIG. 4(b) permit reliable operation in high vibration applications. The "O" ring pressure seals 41 and 42 provide a positive mechanical contact with the pressure plate 90. The seals are situated such that 90 percent of the seal is below the surface of the cubical transducer 40 and 10 percent contacts with the pressure plate 90 upon the placement of the cubical by means of the set screw 46. Because of their location at the bottom of the cubical, the pressure seals 41 and 42, are sufficiently spaced from the set screw 46 so as to eliminate any undo pressure upon tightening of the set screw 46 but yet to maintain a positive and sealing contact with the pressure plate 90.

Figure 2:
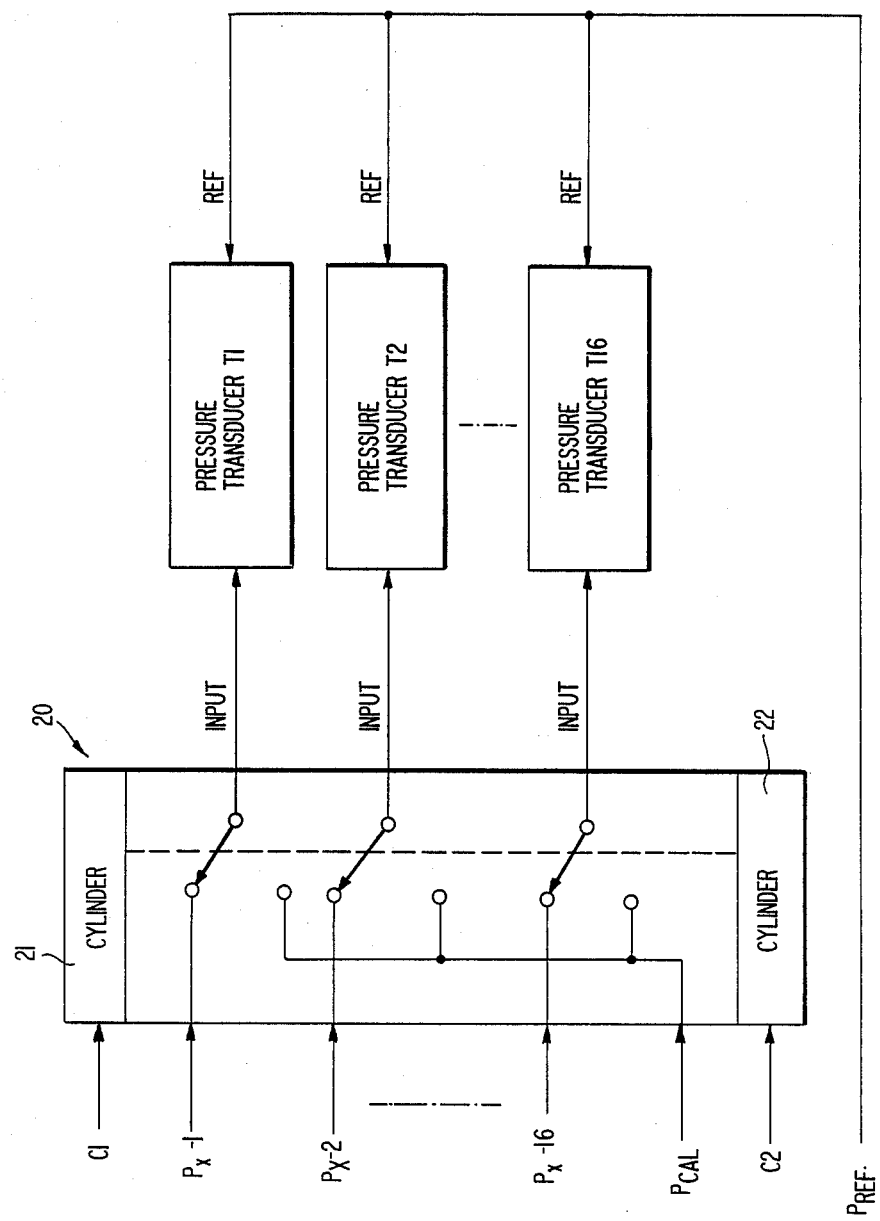
FIG. 2 is a pneumatic diagram of the pressure scanner of the present invention.

The calibration valve itself illustrated schematically as 20 in FIG. 2 and shown pictorially in the cutaway view of FIG. 3 is a two position pneumatically actuated sliding manifold valve which employs dynamic "O" ring seals between the manifold and the input pressure tabulation plate 80. In order to actuate the calibration valve, a momentary 100 psi pulse is applied to one of the two controlled ports C1, C2 causing either of the pistons of the cylinders 21 and 22 to shuttle the manifold to the desired position, either a calibrate mode at which time the $P_{cal}$ is applied to each input or the run mode at which time the pressure $P_{x-1} P_{x-16}$ are applied to the input of the transducers as illustrated in the FIG. 2. Because the valve is bi-stable i.e., it is positively locked in either one of two positions without any need for continued presence of a pressure, the data acquisition will not be interrupted should the control pressure C1 or C2 be lost. In the calibrate position the valve manifolds the pressure sensor inputs to a common port $P_{cal}$ allowing a specific calibration pressure $P_{cal}$ to be applied to all the transducers simultaneously. This is also true with the reference side REF of the pressure transducers which enable a common calibration reference pressure to be applied. On the contrary, in the run position the transducers are ported to their associated measurement ports of the instrument.

The utilization of the dynamic "O" ring seals of FIG. 3(b) allows the calibration valve to be operated over a wide temperature range (minus 20° C. to 90° C.) and a pressure range of 10 inches WC to 500 PSI while still maintaining leak tight operation. It is also very important to realize that the calibration valve can itself be serviced because maintenance or repair of the instrument involves only the replacement of the "O" rings without fear of damage to the remaining parts of the instrument or to its reliability or accuracy. The calibration valve provides a minimum of 10,000 calibrations before the "O" ring replacement is required.

The bi-stable operation design is brought about by the utilization of the two pistons and the fact that the "O" rings provide for a positioning which will not change unless pressure is applied from an opposing piston. Therefore, loss of control pressure will not result in any "in between" position for the valve.

The integral calibration valve is provided with line calibration in which the valve is shuttled to the calibrate position by applying a pressure pulse to the control port C1 and subsequently manifolding all of the pressure inputs to a common pressure input port for simultaneous application of the calibration pressures. A minimum of three pressure calibrations is required to generate a non-linearity of the transducers. A three pressure calibration generates three coefficions (offset, sensitivity and nonlinearity) which can be used to calculate unknown pressures from the following equation:

$$P_x = C0 + C1V + C2V^2$$

where:
 $P_x$ equals pressure to be measured
 C0=offset (psia)
 C1=sensitivity (psia/Volt)
 C2=non-linearity (psia/Volt$^2$)
 V=transducer voltage at $P_x$.

The frequency of calibration varies widely from application to application depending on the desire data quality. In a typical scanner operation which is held at a constant temperature and accuracy of approximately 0.1% FS in a worst case for a 24 hour time span.

Figure 6:
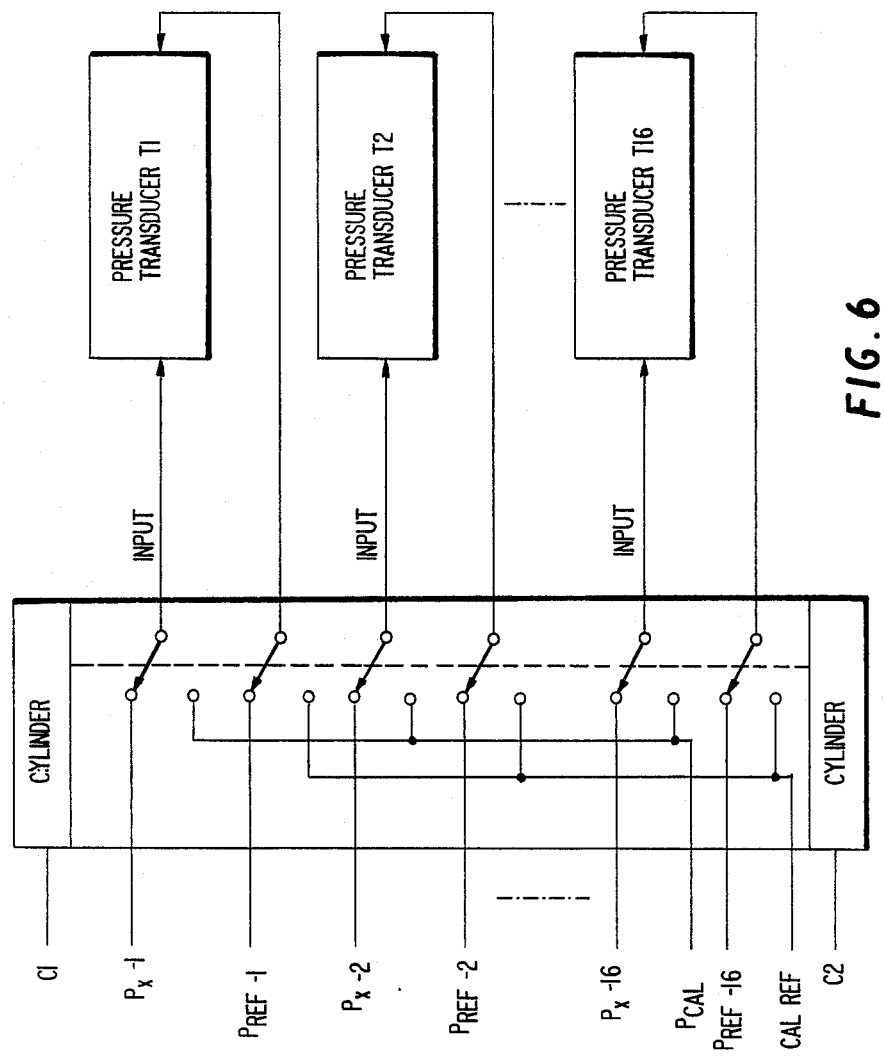
FIG. 6 is a pneumatic diagram of the pressure scanner according to a second embodiment.

In a second embodiment of the present invention, as disclosed in FIG. 6, the reference pressure $P_{ref}$ of FIG. 2 is replaced with individual reference measurement ports PREF-1 to PREF-16. An inspection of FIG. 6 in comparison with FIG. 2 indicates that the main difference between the two embodiments is that the FIG. 6 showing of individual reference ports provides for a measurement system whereby each input is individually referenced which is sometimes necessary depending upon the area and the type of pressure which is being measured. Individual reference pressures for each port provide for a reduction in the amount of error under certain measurement conditions which require the differential pressure between two points. It is to be noted that when calibration takes place utilizing the individual reference port configuration of FIG. 6 the input pressure $P_x--P_x-16$ are switched to be connected in common with the calibration input, as in the FIG. 2 configuration but it is also noted that the individual reference ports are switched from the reference values Ref 1–Ref 16 to a position represented by the term CAL REF.

It is due to the configuration of the pressure scanner construction as shown in FIG. 3a that an individual user may reconfigure a common reference input configuration as in FIG. 2 to that of a individual reference system of FIG. 6 without the need for a separate unit and without the need for returning the unit to the source. Simply a matter of a few moments to replace a calibration valve and change the input pressure tabulation plate in order to perform a reconfiguration of the pneumatic inputs to each of the transducers is all that is necessary to convert from a common reference structure of FIG. 2 to a individual reference measurement structure of FIG. 6. Thus, the package of FIG. 3a provides all the flexibility needed to provide the user with what is effectively two different types of pressure scanners without having to pay for two individual series of transducers.

The design of the transducer provided in the embodiments discussed above was specifically derived from the needs for ground based and flight based aerodynamic testing. The recent interest in the investigation and analysis of unsteady flows in these particular applications required the development of special pressure scanners able to perform at or near the test article.

Figure 7A:
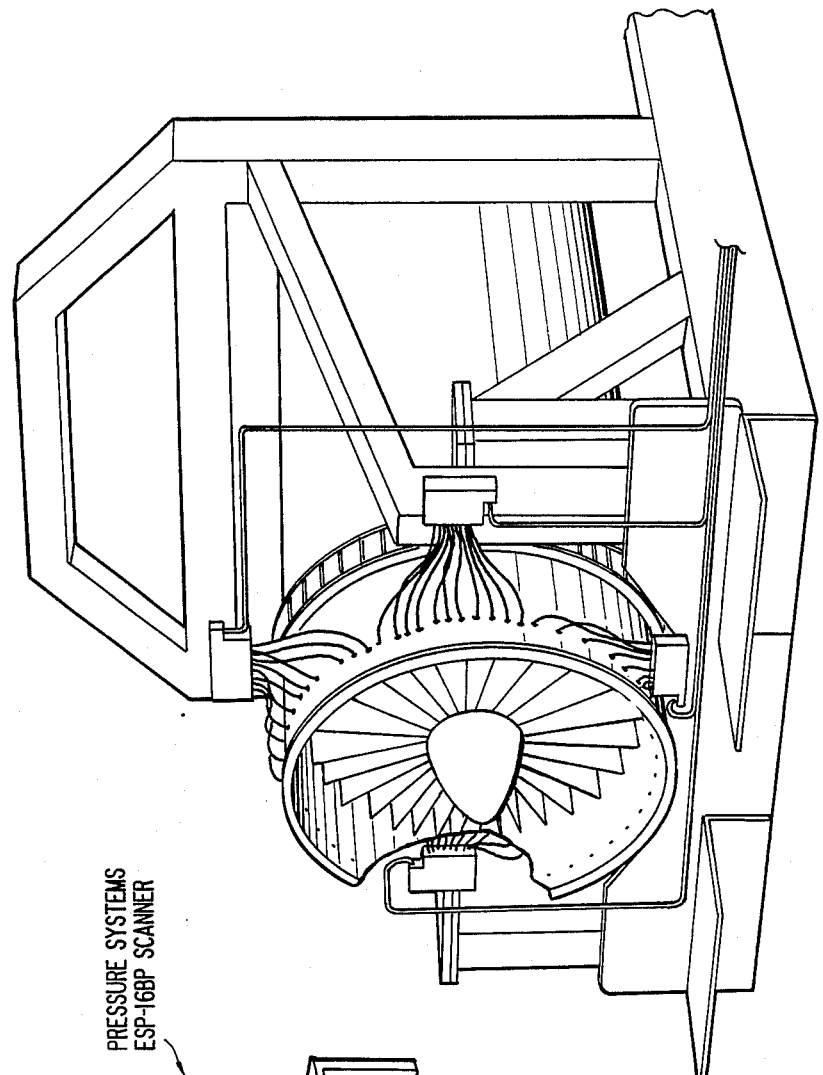
FIG. 7 illustrates an application of the pressure scanner in a turbine stand environment.
Figure 7B:
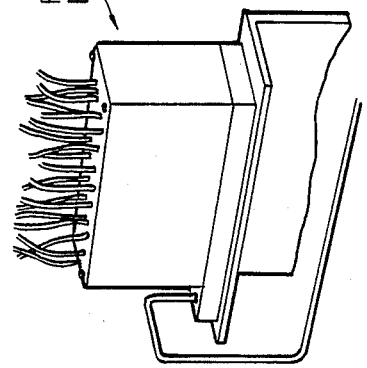

Ground based turbofan testing requires static and low frequency dynamic pressure measurements in order to determine the handling characteristics of an engine. Thus, the scanner needs to be moved from the instrumentation area to the test stand, or in some cases, actually on the engine. The majority of these pressure measurements range from static pressure to 100 Hz. The FIG. 7 illustrates a mounting of a pressure device of the present invention on a test rig. It must be noted that accurate dynamic pressure measurement with such an electronic scanner requires that tubing lengths must be kept to less than one meter. In the type of applications for the test rig shown in, for example FIG. 7, the temperature areas which are encountered require the use of a temperature stabilization jacket (not shown) in order to limit the temperature.

For applications to flight testing, the pressure scanner is subjected to extremes in temperature and in vibration. For in-flight engine measurements, as shown for example in FIG. 8, the pressure scanner is typically located in the engine cowling. On the other hand for flow measurements, the pressure scanner could be mounted in an outboard section of a wing or in a rake assembly. The size, ruggedness and ability to purge the input lines are extremely important in these type of applications and furthermore, it is required that the optional integral heating package, discussed previously, must be included inside the pressure scanner in order to permit its use to temperatures approximating $-50°$ C. The addressing, data acquisition and rezeroing functions are implemented by an on-board flight pressure measurement system such as "Pressure Systems S8256 or by a PCM System of the user".

The pressure response of a scanner is a critical factor in dynamic testing and it is determined by the natural frequency of the pressure transducer within the scanner, the internal volume of the pressure scanner and the length and diameter of the tubing connecting the measurement orifice to the pressure scanner. The pressure scanner of the transducers used in the present structure is in excess of 10,000 Hz. The internal volume is no greater than 0.01 cubic inches and in the majority of applications the transient response or dynamic response of the pressure scanner is determined simply by the length of the tubing.

By scanning the pressure transducer at 20,000 samples per second there is in excess of 1,000 measurements per second per port. From this data the phase and amplitude lag can be corrected with algorithms after the testing has been completed. The addition of one connector, in an alternate configuration, provides that all pressure sensor outputs are provided to the user. In this instance the pressure scanner would be wired directly to the PCM or to the analog input system and would function as an array of transducers. This configuration also has an advantage for dynamic sensor if the user wishes to reduce the phase error generated by time displace sampling.

Obviously, numerous modifications and variations of the present invention are possible in light of the above teachings. It is therefore to be understood that within the scope of the appended claims, the invention may be practiced otherwise then as specifically described herein.

What is claimed as new and desired to be secured by Letters Patent of the United States is:

1. An electronic pressure scanner comprising:
   a plurality of input ports each presenting a pressure to be measured;
   a plurality of field-replaceable transducer modules, each of said transducer modules associated with one of said plurality of input ports;
   a calibration valve means switchable between a first and second postion wherein, in said first position, said calibration valve provides a direct connection between said input ports and said transducer module means and wherein, in said second position, said calibration valve provides a simultaneous calibration input to each of said modules in order to calibrate each of said modules; and
   means for providing a reference signal to each of said transducer modules, wherein each of said transducer modules further comprises an "O " ring quick disconnect interface for interfacing with said calibration valve.

2. The scanner according to claim 1 wherein each of said transducer modules comprises a transducer element, an internal zero offset means, and a thermal compensation means wherein said transducer, said offset means and said thermal compensation means are physically contained within each of said transducer modules.

3. The scanner according to claim 1 wherein said calibration valve has bi-stable operation for accomplishing the switching between said first and second position.

4. The scanner according to claim 1 wherein said calibration valve means includes an input pressure tabulation plate, a calibration valve manifold and a pressure plate wherein said calibration valve manifold separates said pressure plate from said input tabulation plate and wherein said input pressure tabulation plate includes said plurality of input ports.

5. The scanner device according to claim 4 wherein said calibration valve manifold includes a plurality of "O" ring seals on a first surface of said manifold which surface slidably contacts said input pressure tabulation plate during the operation of said calibration valve means.

6. The pressure scanner according to claim 4 wherein each of said interfaces provides mechanical and pneumatic connection by means of at least one "O " ring to a second surface of said pressure plate.

7. The pressure scanner according to claim 6 wherein said connection means comprises a mechanical fastening means for mechanically connecting each of said transducer modules to said second surface of said pressure plate.

8. The pressure scanner according to claim 7 wherein said fastening means is a set screw passing through each of said transducer modules and fitting into a threaded aperture in said pressure plate.

9. The pressure scanner according to claim 1 wherein said means for providing a reference signal to each of said transducer modules comprises a means for providing a common reference value to each of said modules.

10. The pressure scanner according to claim 1 wherein said means for providing a reference signal to each of said transducer modules comprises a plurality of input reference ports wherein each of said reference ports is associated respectively with each of said transducer modules to provide individual reference measurement for each pressure to be measured.

11. An electronic pressure scanner comprising:
a plurality of input ports each representing a pressure to be measured;
a plurality of transducer modules, each of said transducer modules associated with one of said plurality of input ports and each of said transducer modules comprising a transducer element, an internal zero offset means and thermal compensation means each physically contained within each of said modules;
a calibration valve connected between said input ports and said transducer modules wherein each of said transducer modules are individually, mechanically and pneumatically connected by connection means to said calibration valve; and
means for providing a reference signal to each of said transducer modules.

12. The scanner according to claim 11 wherein said calibration valve comprises a two position pneumatically actuated sliding manifold valve wherein said valve is bi-stable and in a first position said manifold provides for a direct connection between said input ports and said plurality of transducer modules and wherein a second position of said manifold valve provides for a common port connection of a specific calibration pressure to be applied to all of said transducer modules simultaneously.

13. The scanner according to claim 11 wherein said calibration valve includes a pressure plate and wherein each of said transducer modules has a surface which is mechanically and pneumatically connected by a connection means to said pressure plate.

14. The pressure scanner according to claim 14 wherein said connection means comprises at least pne "O" ring seal.

15. The pressure scanner according to claim 14 wherein said connection means further comprises a set screw for mechanically retaining said transducer on said pressure plate.

16. The pressure scanner according to claim 11 wherein each of said transducer modules comprise a piezo resistive silicon pressure transducer, a circuit board for compensation elements and an electrical connector and wherein said transducer, said circuit board and said connector are all encapsulated in a cubical die cast housing having at least one "O" ring seal.

17. The scanner according to claim 16 wherein said piezo resistive transducer comprises a micro-machined diaphram into which four piezo resistors have been difused.

18. The scanner according to claim 11 further comprising:
digitally addressed analog multiplexer circuit means connected to an output of each of said transducer modules and an internal instrumentation amplifier for amplifying the multiplexed outputs of said transducers.

19. The scanner according to claim 18 further comprising a precision power supply for providing each of said transducer modules with a stable and repeatable sensor excitation voltage in order to minimize the number of required power supplies for said scanner and to eliminate the need for external supply of critical excitation voltages.

* * * * *